Patented Dec. 17, 1946

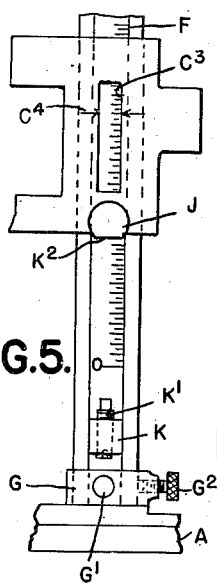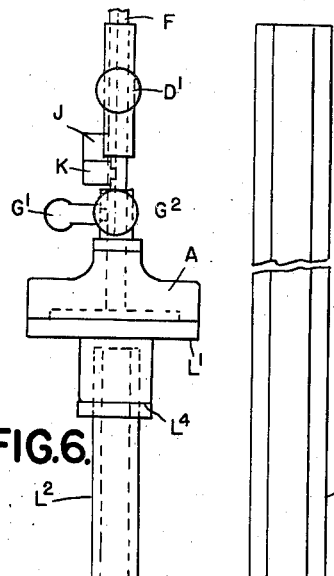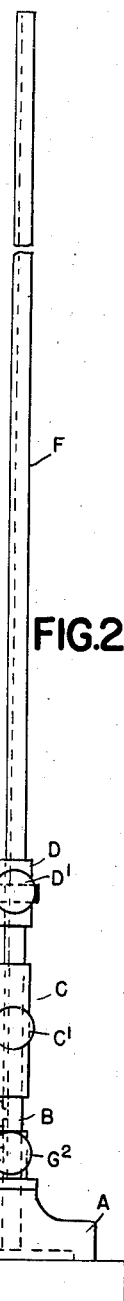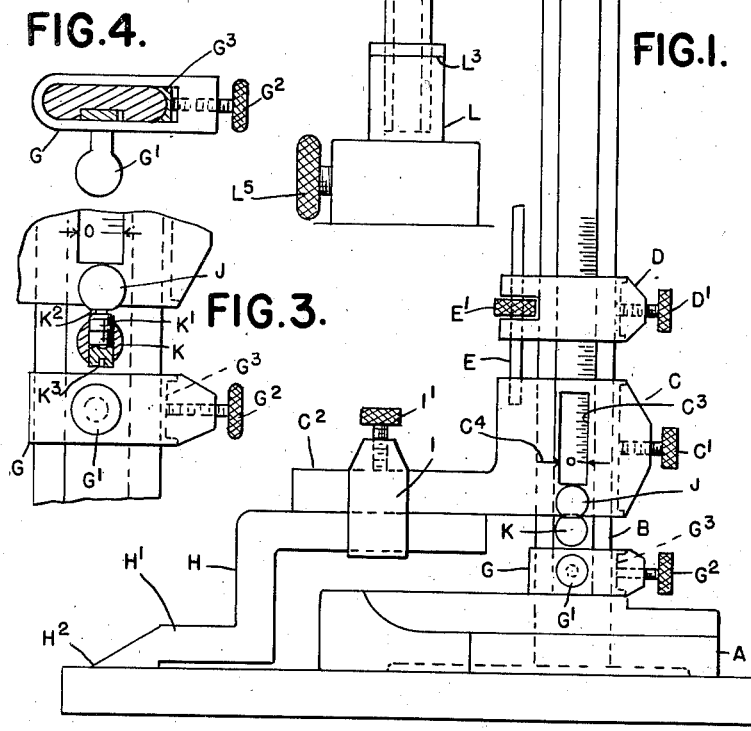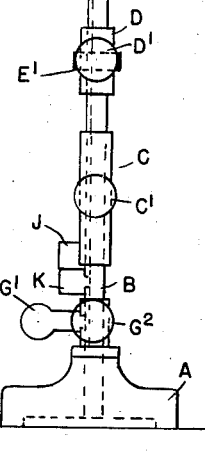

2,412,870

UNITED STATES PATENT OFFICE 2,412,870

SURFACE LAYOUT GAUGE

Walter B. Champlin, Detroit, Mich.

Application September 13, 1943, Serial No. 502,169

5 Claims. (Cl. 33—169)

The invention relates to gauges and more particularly to surface layout gauges which are employed in marking exact heights above a supporting base plate.

In the performance of work with instruments of this character the dimensions given on the drawing are not taken from a single point, but are frequently marked between successive points in the structure. Consequently, if the operator is working with his gauge from a single plane it is necessary to make a mental calculation in the laying out of a dimension which is not taken from this plane. Certain constructions of gauges have been provided with sliding scales so that after laying out one dimension the scale may be shifted with its zero marking at a different point to lay out another dimension. However, in thus successively shifting the scale there may be slight errors in adjustment so that certain of the markings will be inaccurate.

It is the object of the instant invention to obtain a construction of gauge provided with a movable scale in which accuracy in adjustment is at all times assured. It is a further object to provide for accurate laying out of dimensions which are beyond the limits of adjustment of the gauge proper. With these objects in view, the invention consists in the construction as hereinafter set forth.

In the drawing:

Fig. 1 is a side elevation of my improved gauge;

Fig. 2 is an end elevation thereof;

Fig. 3 is a view similar to a portion of Fig. 1 illustrating the means for effecting accurate adjustment of the scale;

Fig. 4 is a cross section on line 4—4, Fig. 3;

Fig. 5 is a view similar to Fig. 3 showing the parts in a different position of adjustment; and Fig. 6 is a sectional elevation of the extension standard for the gauge.

As illustrated, A is the supporting base and B a column rising therefrom. C is a slide adjustable upon the column B and clamped thereto in different positions of adjustment by the set screw C'. D is an auxiliary slide having a set screw D' and an adjustable link E between the same and the slide C. This link comprises a threaded rod attached to the slide C and passing through an aperture in the slide D with an adjusting nut E' on said rod arranged in a slot in the member D. This is the usual means employed in gauge constructions for facilitating accuracy in adjustment of the main slide.

Mounted on the column B and preferably engaging a groove therein is a scale member F. This is provided with means for clamping the scale in different positions of adjustment on the column which, as shown, comprises a strap G surrounding the column and secured to the lower end of the scale. A handle G' projecting from the strap is used for adjusting the same and a set screw $G^2$ engaging a clamping block $G^3$ serves to hold this strap in any adjusted position. The slide C has a projecting arm $C^2$ to which is attachably secured the indicating arm or scriber H. This, as shown, is attached to the arm C by a strap I and set screw I'. Also the member H has a downwardly offset portion H' terminating in the scriber point $H^2$. This permits of lowering the slide C until the point $H^2$ is in the supporting plane of the base A.

As has been stated, it is one of the objects of my invention to obtain extreme accuracy in adjustment of the scale so that its position is always a predetermined distance above the supporting base. To secure this result, I employ a pair of cooperating lugs or contact members J and K, the one secured to the slide C and the other to the scale member F. These contact members are so positioned relative to the markings on the scale member that when the point $H^2$ is in the supporting plane of the base and the members J and K are in contact with each other the zero marking on the scale will register with an index line on the slide. Preferably the slide C is provided with a window opening $C^3$ through which the markings on the scale may be read and in index line $C^4$ extending on opposite sides of this opening registers with the zero marking under the conditions just described. To provide for extreme accuracy in the setting of the members J and K in relation to each other, the latter may be (as shown in Fig. 3) provided with a screw K' engaging a threaded aperture therein and provided with a projecting contact portion $K^2$. The screw has a wrench socket $K^3$ in its outer end portion so that it may be adjusted in its threaded bearing and the friction will be sufficient to hold it in any position of adjustment. Thus, the original setting of the contacts $K^2$ in relation to the member J may be made with extreme accuracy and at any time subsequently readjustment may be made to compensate for wear.

Operation

In laying out of work with the gauge, the member to be marked is placed on a suitable supporting surface, such as a surface plate, and the base A of the gauge is also placed on this surface. Assuming that certain dimensions on the drawing are taken from the plane in the structure which rests on the support then these may be readily laid out by adjusting the slide C to the corresponding dimensions on the scale F. The point H² on the arm H may be used as a scriber for marking the lines on the structure. Where a dimension on the drawing is taken from a point above the supporting base plane, the operator after first adjusting the slide C to mark this point then unclamps the strap G and raises the scale member F until the contact K² bears against the lug J. This will restore the zero marking on the scale into registration with the line C⁴ and after again clamping the strap G the slide C may be adjusted to a marking on the scale corresponding to the dimension.

The height of the gauge cannot be unduly extended without either producing lack of rigidity in the structure or objectionably increasing its weight. I have therefore provided an auxiliary standard which may be used in conjunction with the gauge for the marking of dimensions that are beyond the range of the gauge height. This auxiliary standard is illustrated in Fig. 6 and comprises a base L, a surface plate L' and an intermediate member L². The latter is preferably a hollow rod engaging sockets in the members L and L' and provided with shoulders L³ and L⁴ for respectively bearing on said members. The dimension between these shoulders is of an exactly predetermined length so that the upper face of the surface plate L' is an exact height above the lower face of the base L. Preferably this base L is provided with a permanent magnet controlled by a knob L⁵ so that after being positioned on the base plate it is held thereon by magnetic attraction. The surface plate L' is of sufficient area to furnish adequate support for the base A of the gauge. Consequently, the gauge may be placed on this surface plate and dimensions laid out on the work which are known to be a predetermined height above the supporting base for the standard. To increase the range of this standard, the intermediate member L² may be exchangeable with other corresponding members of different lengths to change the dimensions between the surface plate and the base. By the use of the instrument above described, work may be laid out much more expeditiously and with greater accuracy than possible with constructions heretofore used.

As shown in Fig. 1, the indicator is resting upon the supporting surface plate and the strap G resting upon the base A. This will hold the zero marking on the scale in registration with the index line C⁴. Consequently, when the slide C is at any position of adjustment on the column B the total height of the indicator above the supporting plane for the base will be indicated by lowering the scale till the strap G rests on the base A. This is an important feature for it permits the user to at any time summarize a series of successive markings giving the sum of the separate measurements in one total on the scale.

What I claim as my invention is:

1. A layout gauge comprising a base, a column rising therefrom, a slide on said column, a scale vertically adjustably mounted on said column, means for locking said scale to said column in different positions of adjustment, an indicator arm projecting laterally from said slide, and cooperating members on said slide and scale adapted when in contact to register the zero marking on the scale with an index on the slide whereby a direct reading on said scale may be taken of a dimension between any two positions of said indicator.

2. A layout gauge comprising a base, a column rising therefrom, a slide on said column, a scale vertically adjustably mounted on said column, means for locking said scale to said column in different positions of adjustment, an indicator arm projecting laterally from said slide, cooperating members on said slide and scale adapted when in contact to register the zero marking on the scale with an index on the slide, and means for adjusting the contact on one of said members facilitating the original setting thereof and readjustment to compensate for wear.

3. A layout gauge comprising a base, a column rising therefrom, a slide on said column, a scale vertically adjustably mounted on said column, means for locking said scale to said column in different positions of adjustment, an indicattor arm projecting laterally from said slide, cooperating members on said slide and scale adapted when in contact to register the zero marking on the scale with an index on the slide, and a screw threadedly engaging one of said members forming the contact with the other of said members and adapted to be adjusted to attain accuracy in the original setting and also readjustment to compensate for wear.

4. A layout gauge comprising a base, a column rising therefrom, a slide on said column, a scale vertically adjustably mounted on said column, means for locking said scale to said column in different positions of adjustment, an indicator arm projecting laterally and downwardly from said slide and movable therewith to extend into the supporting plane of the base, cooperating members on said slide and scale adapted when in contact to register the zero marking on the scale with an index on the slide, and a stop for limiting the downward adjustment of said scale to a position where zero is indicated when said indicator arm lies in the supporting plane of said base.

5. A layout gauge comprising a base, a column rising therefrom, a slide on said column, a scale vertically slidable in a groove in said column, a strap to which the lower end of said scale is attached surrounding and slidable on said column, clamping means for holding said strap in different positions of adjustment, an indicator arm projecting laterally from said slide, and cooperating members on said slide and scale adapted when in contact to register the zero marking on the scale with an index on the slide, said strap when lowered to rest on said base positioning said scale so as to give a direct reading of the total height of the indicator above the supporting plane for the base in each position of adjustment of said slide.

WALTER B. CHAMPLIN.